United States Patent
Fukunaga (10) Patent No.: US 6,728,410 B1
(45) Date of Patent: Apr. 27, 2004

(54) PICTURE CODING METHOD AND APPARATUS REDUCING SIZE OF CRITICAL SEGMENTS

(75) Inventor: Shigeru Fukunaga, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 682 days.

(21) Appl. No.: 09/588,022

(22) Filed: Jun. 6, 2000

(30) Foreign Application Priority Data

Nov. 26, 1999 (JP) .......................................... 11-335649

(51) Int. Cl.$^7$ ................................................. G06K 9/36
(52) U.S. Cl. .................... 382/236; 382/251; 375/240.03
(58) Field of Search ................................ 382/232–233, 382/236, 238, 239, 251, 173; 348/390.1, 439.1; 375/240, 240.03; 709/247

(56) References Cited

U.S. PATENT DOCUMENTS

| | | | | |
|---|---|---|---|---|
| 5,289,276 A | * | 2/1994 | Siracusa et al. | 348/469 |
| 5,598,213 A | * | 1/1997 | Chung et al. | 375/240.04 |
| 5,638,125 A | * | 6/1997 | Jeong et al. | 375/240.03 |
| 5,768,533 A | * | 6/1998 | Ran | 709/247 |
| 5,778,191 A | * | 7/1998 | Levine et al. | 709/247 |
| 5,903,673 A | * | 5/1999 | Wang et al. | 382/236 |
| 6,289,297 B1 | * | 9/2001 | Bahl | 703/2 |
| 6,356,309 B1 | * | 3/2002 | Masaki et al. | 348/439.1 |
| 6,519,004 B1 | * | 2/2003 | Bahl | 348/385.1 |

FOREIGN PATENT DOCUMENTS

| JP | 63-304745 | 12/1988 |
|---|---|---|
| JP | 01-097021 | 4/1989 |
| JP | 08-256149 | 10/1996 |

OTHER PUBLICATIONS

Ding, et al. "Rate control of MPEG video coding and recording by rate–quantization modeling", IEEE, pp. 12–20, 1996.*

Heng, et al. "Effects of cell loss on the quality of service for MPEG video in ATM environment", IEEE, pp. 11–15, 1995.*

Zhang, et al. "Optimal intra/inter mode switching for robust video communication over the intenet", IEEE, pp. 332–336, 1999.*

Dagiuklas, et al. "Packet video transmisson in an ATM network using forced frame refreshement", IEEE, pp. 784–787, 1996.*

Telecommunication Standardization Sector of ITU, "Line Transmission of Non–Telephone Signals: Video Codec for Audiovisual Services at p×64 kbits," ITU–T Recommendation H.261, adopted Mar. 1993, pp. 1–25.

Telecommunicaton Standardization Sector of ITU, "Line Transmission of Non–Telephone Signals: Video Coding for Low Bitrate Communication," Draft ITU–T Recommendation H.263 as of Dec., 1995, pp. 1–43.

* cited by examiner

*Primary Examiner*—Daniel Mariam
(74) *Attorney, Agent, or Firm*—Venable LLP; Michael A. Sartori; Daniel G. Vivarelli

(57) ABSTRACT

A picture coder divides a frame of coded picture data into a critical segment including information needed for decoding other segments in the frame, and at least one non-critical segment including only information needed for its own decoding. The critical segment is made smaller than the non-critical segments, by controlling the segment size directly, for example, or by controlling a quantization step size or a forced intra-coding rate. The small size reduces the probability of the loss of critical information during packet transmission of the coded data, when each segment is transmitted as a separate packet. Alternatively, the size of all segments is reduced when conditions on the communication path indicate a high probability of transmission errors.

12 Claims, 8 Drawing Sheets

PICTURE CODING METHOD AND APPARATUS REDUCING SIZE OF CRITICAL SEGMENTS

BACKGROUND OF THE INVENTION

The present invention relates to a picture coding method and apparatus for coding still or moving pictures that are divided into segmented frames.

The term 'frame' refers to one complete still picture, or one complete still picture in a sequence of pictures constituting a moving picture, or to the corresponding part of a video object plane.

Recent years have seen the emergence of various international standards for coding pictures for transmission by videophones, videoconferencing systems, video-on-demand (VOD) systems, and the like. For still pictures, the JPEG method, developed by the Joint Photographic Experts Group and adopted by the International Organization for Standardization (ISO), is well known. For moving pictures, the Telecommunication Standardization Sector of the International Telecommunication Union (ITU-T) has developed standards described in recommendations H.261, H.262, and H.263, and the Moving Picture Experts Group has developed ISO standards referred to as MPEG-1, MPEG-2, and MPEG-4.

The methods adopted in these standards code a picture by dividing the picture into small regions referred to as macroblocks. The term 'macroblock' is used because a macroblock is divided into several smaller blocks. Each block or macroblock is coded separately by a process that typically includes a mathematical transform, quantization of the resulting coefficients, and coding of the quantized data. For moving pictures, the coding may be carried out in an inter-frame mode, in which the macroblock is coded with reference to corresponding data from a preceding frame, or an intra-frame mode, in which the macroblock is coded without such reference. Each of these coding modes may have various sub-modes.

The bitstream generated by the coding process includes both the coded macroblock data and general information pertaining to the picture as a whole. Examples of this general information include frame timing information and coding-mode information. The general information is more critical than the coded macroblock data, because if the general information is lost or corrupted by an error, it may become impossible to decode an entire frame, whereas the loss or corruption of coded macroblock data usually affects only part of a frame.

Figure 1:
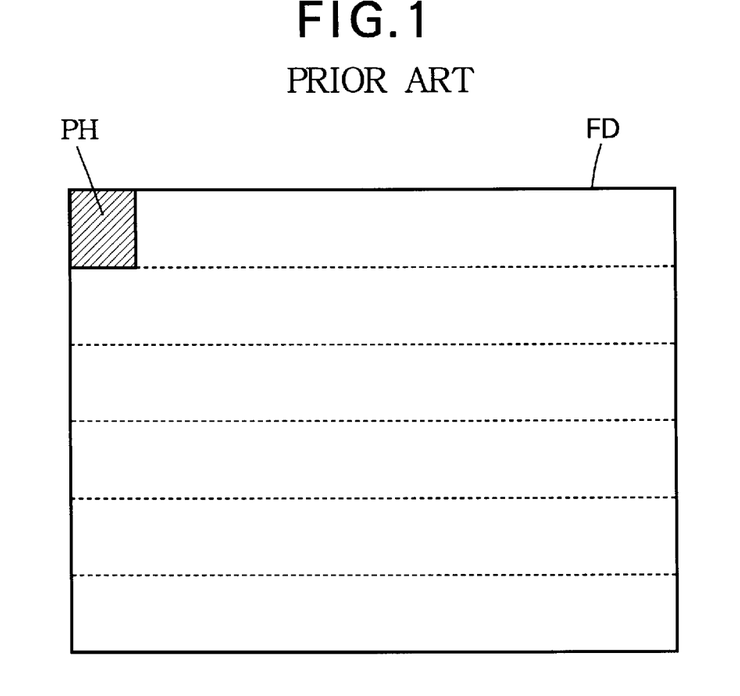
FIG. 1 illustrates a coded frame having a picture header.

The general information about a frame is placed in a header at the beginning of the coded frame data. The header is referred to in various standards as a frame header, picture header, or access unit header. The term 'picture header' will be used below to denote all these types of headers. FIG. 1 shows an example of coded frame data (FD) starting with a picture header (PH).

Although the coder may generate a substantially continuous bitstream, when the bitstream is transmitted through a communication network, it is usually divided into a series of separate units. If the Transmission Control Procedure/Internet Protocol (TCP/IP) is employed, for example, the bitstream is divided into units referred to as IP packets. As another example, ITU-T recommendation H.223 describes a time-division multiplexing scheme for media data (picture data, audio data, and other data) in which the various media data are divided into separate packets for transmission.

Figure 2:
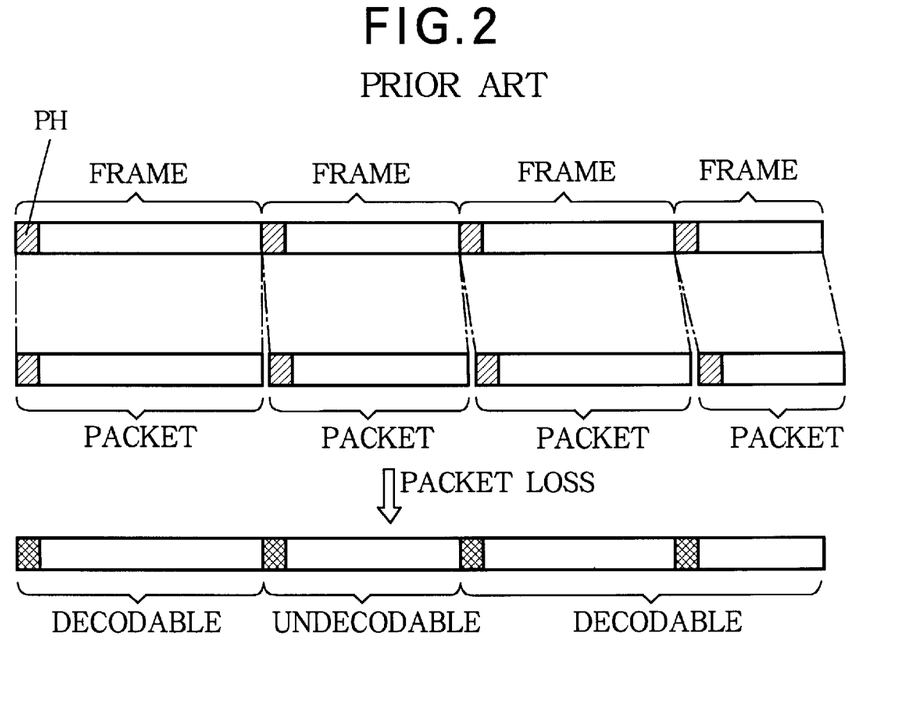
FIG. 2 illustrates the transmission of coded frames as packets.
Figure 3:
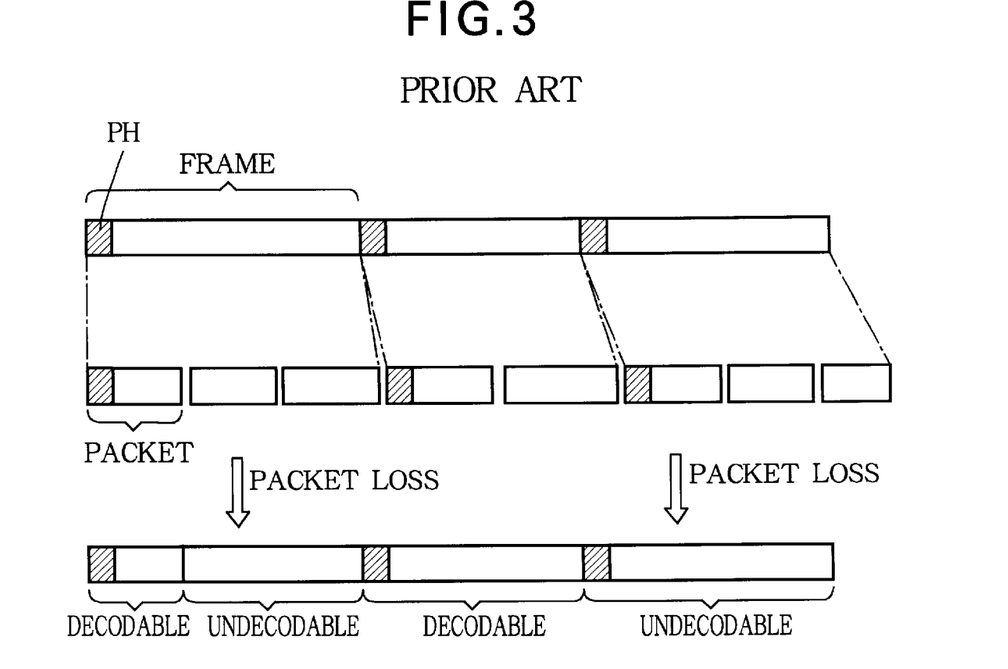
FIG. 3 illustrates the transmission of coded frames as multiple packets each.

In packet communication networks, packets must sometimes be discarded or 'dropped' due to congestion at a network node. To limit the effect of a dropped packet to a single frame, each frame can be transmitted as a separate packet, as shown in FIG. 2. Since larger packets are more likely to be dropped than smaller packets, however, each frame can be more advantageously divided into a plurality of packets, as shown in FIG. 3. In this case, when a packet is dropped, synchronization is temporarily lost, making it impossible to decode the dropped packet and any following packets in the same frame, but synchronization is regained when the next picture header is recognized, making the next frame decodable.

In both FIGS. 2 and 3, the loss of a single packet tends to have an undesirably large effect on picture quality. To reduce this effect, the above-mentioned standards employ synchronization units smaller than a frame. These smaller synchronization units are known in the various standards as segments, groups of blocks (GOBs), slices, and video packets. The term 'segment' will be used below to refer to any of these synchronization units. Each segment in a frame comprises a plurality of macroblocks, and includes a segment header giving information needed for decoding the constituent macroblocks. Each segment is transmitted as a separate packet.

Figure 4:
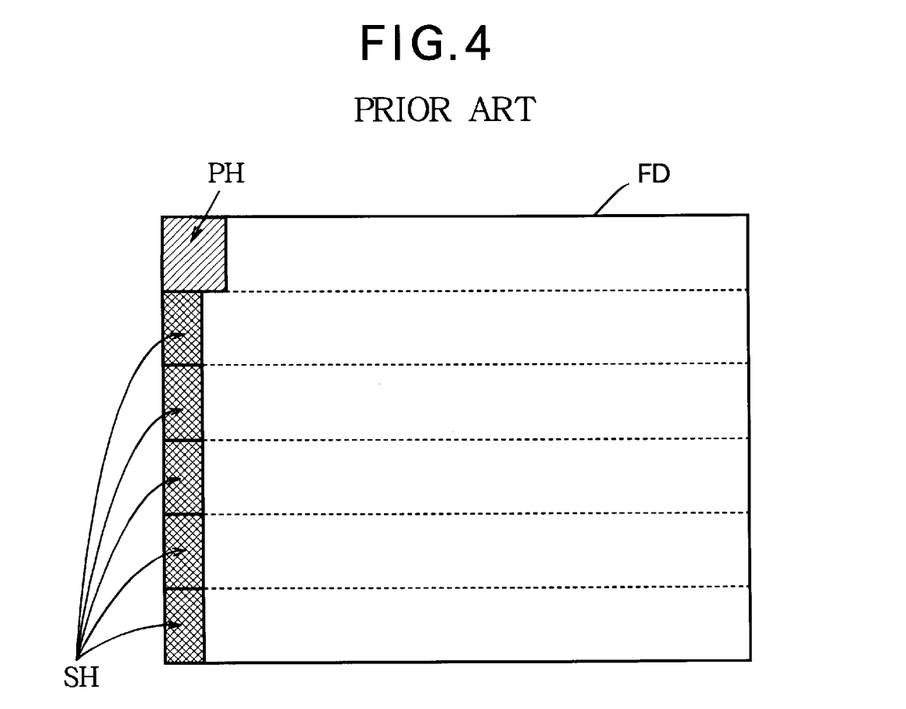
FIG. 4 illustrates a coded frame divided into segments.
Figure 5:
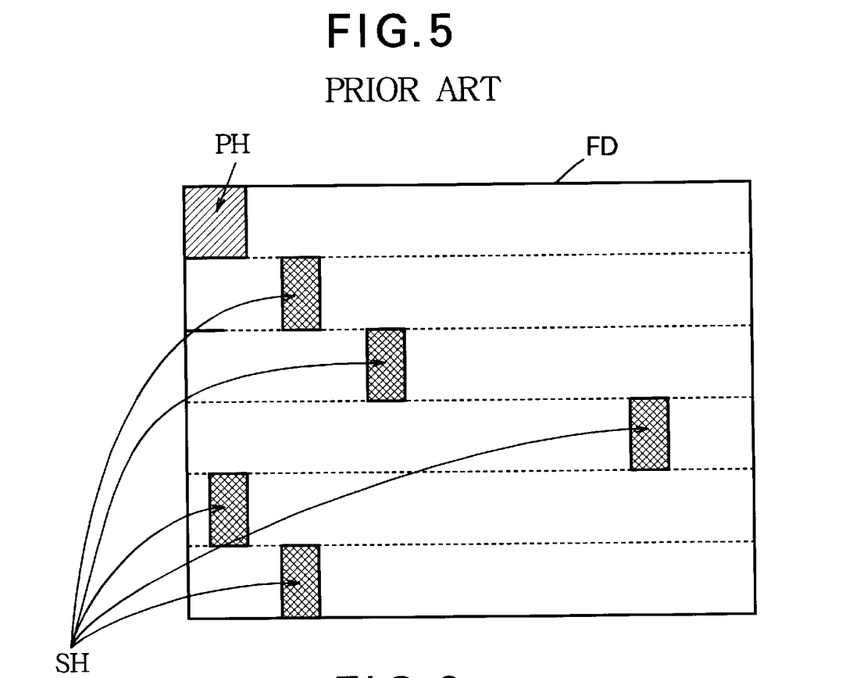
FIG. 5 illustrates another coded frame divided into segments.

FIG. 4 shows an example of a frame divided into segments at predetermined locations, the first segment beginning with a picture header (PH), the following segments beginning with respective segment headers (SH). This type of fixed segment structure is used in the H.261 and H.263 standards. FIG. 5 shows an example in which the segment divisions can be made in arbitrary positions in the frame, as allowed in the H.263 and MPEG-4 standards.

An issue in these segmentation schemes is how much information to put into the segment headers. If all of the information in the picture header is repeated in each segment header, then the loss of a packet never affects more than one segment in the frame, but the repeated header information uses up so many bits that picture quality may be noticeably degraded in all segments, because fewer bits are available for coding the macroblock data.

The most efficient scheme is to place information pertaining to the frame as a whole in the picture header, and place information pertaining only to a particular segment in the segment header. The problem with this scheme is that the loss of the packet including the picture header makes the entire frame undecodable.

A compromise scheme places information applying to the frame as a whole in the picture header, and repeats this information in the segment headers if it differs from the corresponding information in the preceding frame. Each segment header also includes information applying only to its own segment. Then even if the segment including the picture header is lost, the other segments can be decoded by use of the picture header from the preceding frame. This scheme is still fairly inefficient, because a comparatively large amount of picture-header information must often be repeated in the segment headers.

A more efficient compromise scheme sets a flag in a segment header when the picture header contains information pertaining to the segment and differing from the information in the preceding frame. If the picture header is lost, segments in which this flag is not set are decoded using the picture header of the preceding frame, while segments in which this flag is set are not decoded.

Figure 6:
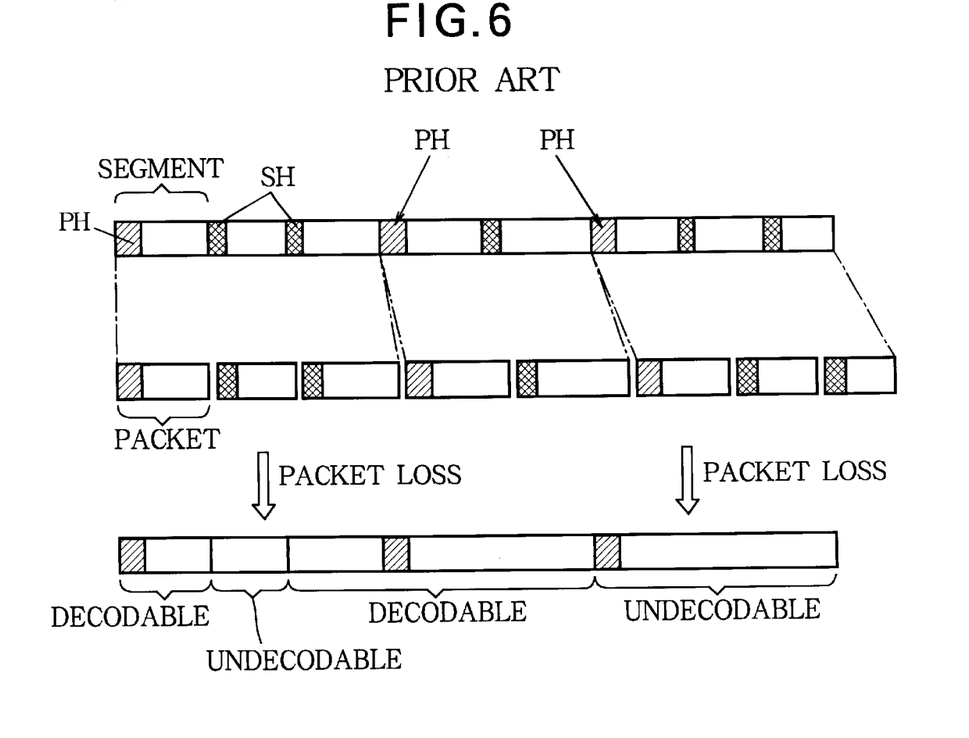
FIG. 6 illustrates the transmission of coded frames divided into segments.

FIG. 6 shows an example in which this flag scheme is employed. The second segment in the first frame is lost, but the other segments in the first frame can be decoded, as can the entire second frame. In the third frame, however, the first segment is lost. The picture header in this segment includes information pertaining to all the segments in the frame, and this information differs from the information in the preceding frame, so none of the segments can be decoded. As this example shows, the use of flags fails to prevent the loss of an entire frame in the not-so-rare case in which a picture header including information differing from the preceding frame is lost.

When each segment is transmitted as a separate packet, the probability of packet loss can be reduced by reducing the segment size: for example, by reducing the number of macroblocks per segment, or the amount of coded data per segment. As a result, however, each frame is divided into more segments, and coding efficiency is adversely affected by the need for more segment headers.

The basic problem with all of the conventional schemes outlined above is that to reduce the probability of picture-header loss, they require much additional header information, with a corresponding penalty in coding efficiency.

The same problem occurs if these schemes are used for protection against read/write errors when coded picture data are stored on recording media.

SUMMARY OF THE INVENTION

An object of the present invention is to provide improved protection against the loss of critical information in coded picture data.

Another object of the invention is to provide such protection without increasing the necessary amount of coded data.

Another object is to minimize the amount of coded data needed to obtain adequate protection from data loss.

According to a first aspect of the invention, each frame of a coded picture is divided into critical and non-critical segments. A critical segment includes information, such as a picture header, needed for decoding other segments in the same frame. A non-critical segment includes only information needed for its own decoding. The coding process is controlled so that, on the average, critical segments are smaller than non-critical segments.

The segment size may be controlled directly or indirectly. Indirect methods of controlling the segment size include using a larger quantization step size in critical segments than in non-critical segments, and using a lower forced intra-coding rate in critical segments than in non-critical segments.

According to a second aspect of the invention, each frame of coded picture data is divided into segments, each segment having a header. The segment size is controlled dynamically, according to a communication condition related to the occurrence of transmission errors on a communication path over which the coded segments are transmitted. The segment size is increased under conditions associated with a low transmission error rate, and is decreased under conditions associated with a high transmission error rate.

Both aspects of the invention provide enhanced protection for critical information, because smaller segments are less likely than large segments to experience transmission errors.

The first aspect of the invention provides enhanced protection for critical information without increasing the amount of coded data. The amount of coded data may actually be reduced.

The second aspect of the invention minimizes the necessary amount of coded data by minimizing the number of segments, hence the number of headers.

DETAILED DESCRIPTION OF THE INVENTION

Embodiments of the invention will be described with reference to the attached drawings, in which like parts are indicated by like reference characters.

Figure 7:
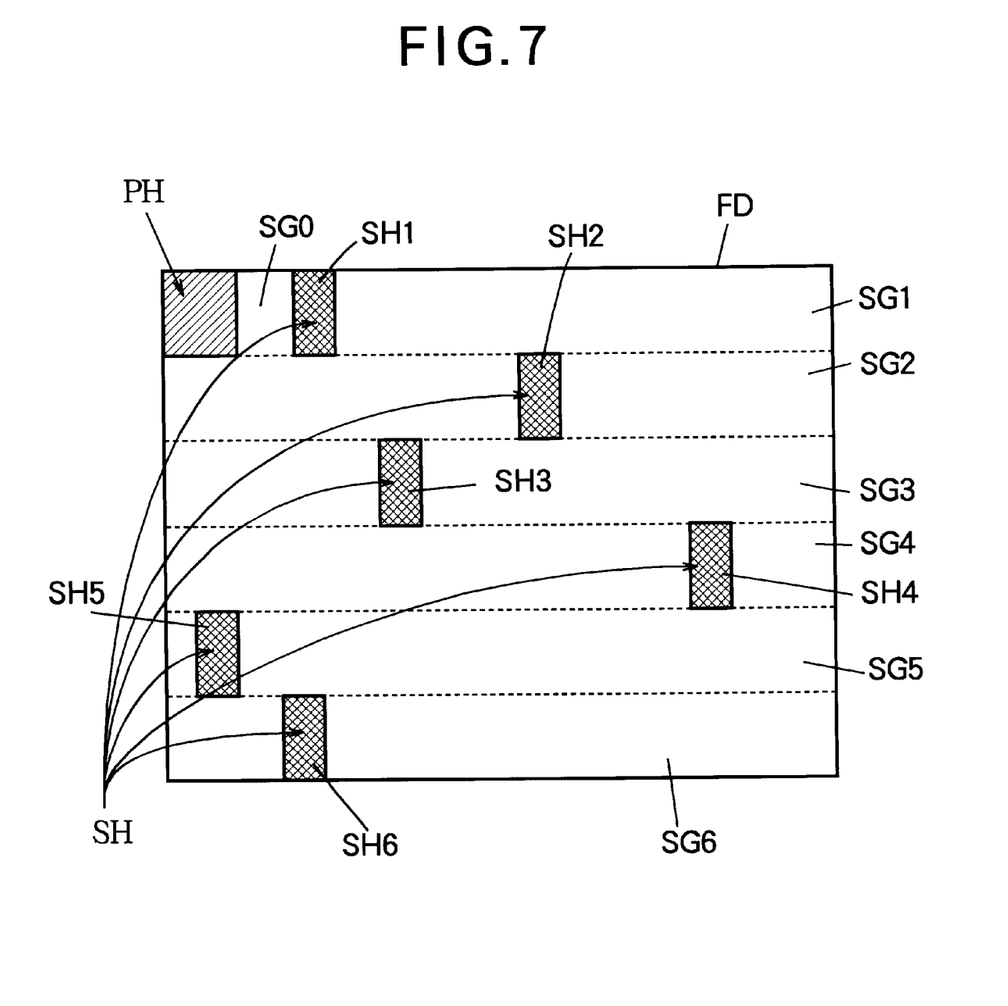
FIG. 7 illustrates a coded frame divided into segments according to the present invention.

The first embodiment divides a frame into a plurality of segments, among which the first segment, including the picture header, is the smallest segment, at least on the average. FIG. 7 shows an example in which a frame is divided into seven segments. The first segment SG0 includes the picture header PH, and may include coded data for one or more macroblocks. The other segments SG1 to SG6 include respective segment headers SH1 to SH6, and coded data for at least one macroblock each.

The picture header PH includes information applying in common to all of the segments, making the first segment SG0 the critical segment in the frame. The picture header PH may also include information applying to the first segment SG0 individually.

Each segment header SHn (n=1 to 6) includes information applying to its own segment SGn, and preferably includes a flag indicating whether the common information in the picture header PH is different from the common information in the preceding frame. A segment header may also include certain items of common information that change with every frame. Segments SG1 to SG6 are non-critical, because they do not include information needed for decoding other segments in the same frame.

Segments SG1 to SG6 have substantially equal sizes. Size may be measured either in coded bits or in coded macroblocks. In the former case, each of the six segments SG1 to SG6 includes substantially the same number of coded bits, regardless of the number of macroblocks encoded by the bits. In the latter case, each segment includes substantially the same number of coded macroblocks, regardless of the number of bits used to code the macroblocks.

The first segment SG0 includes, for example, substantially half the number of coded bits or coded macroblocks as the other segments. Alternatively, this segment SG0 includes just one coded macroblock, or no coded macroblocks.

Figure 8:
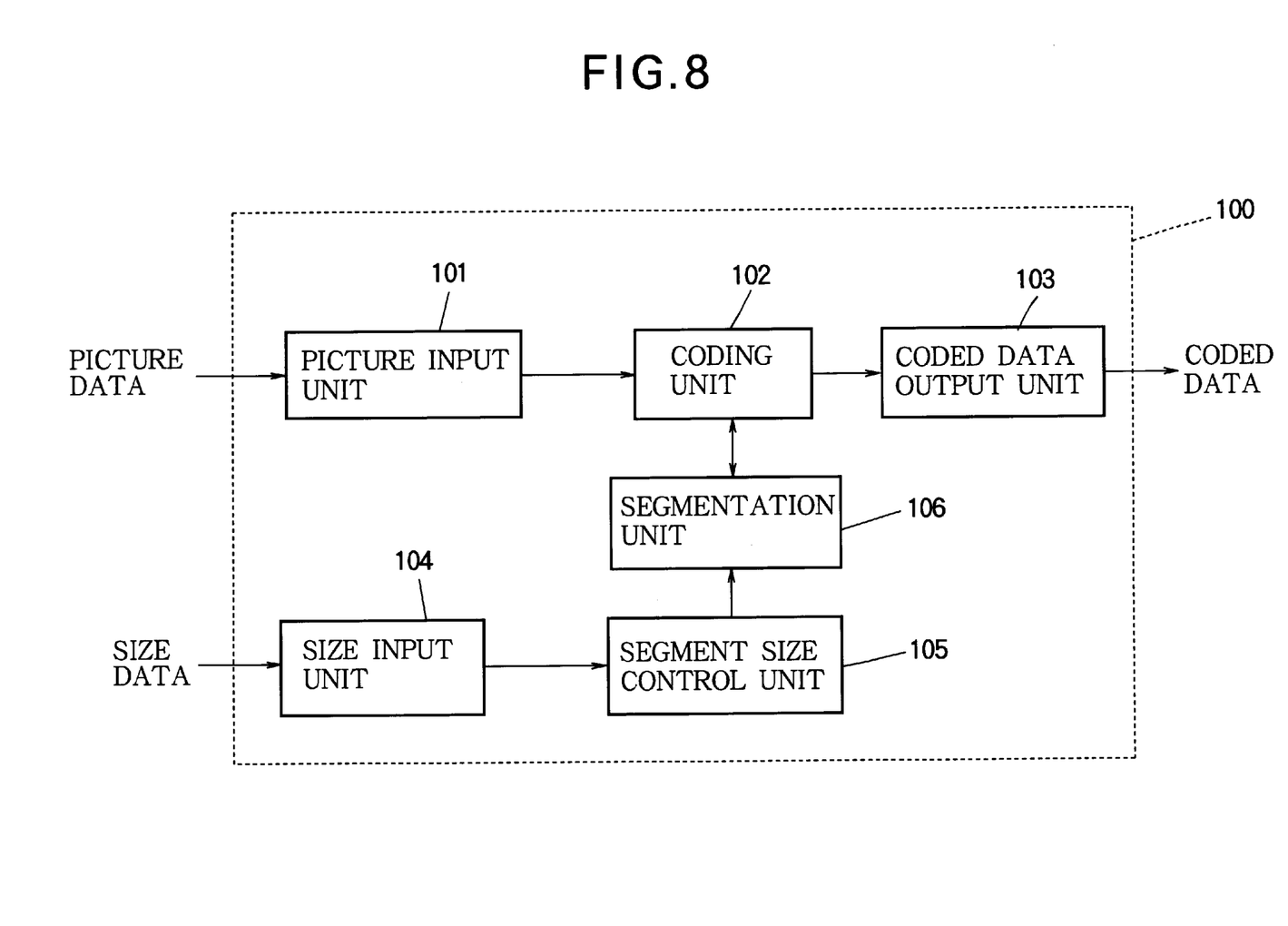
FIG. 8 is a block diagram of a picture coder illustrating a first embodiment of the invention.

Referring to FIG. 8, the picture coder 100 in the first embodiment comprises a picture input unit 101, a coding unit 102, a coded data output unit 103, a size input unit 104, a segment size control unit 105, and a segmentation unit 106.

The picture input unit 101 receives picture data supplied from, for example, a video camera or recording device.

The coding unit 102 divides the received picture data into macroblocks, codes the macroblocks one by one, and generates picture headers and segment headers. As it codes the macroblocks, the coding unit 102 informs the segmentation unit 106 of the amount of coded data generated. This may be done by reporting the actual number of coded bits after each macroblock is coded, by reporting an estimated number of coded bits before each macroblock is coded, or by reporting a cumulative number of coded bits for all macroblocks in the current segment. Alternatively, the coding unit 102 may simply inform the segmentation unit 106 that a coded macroblock has been generated, omitting this notification for macroblocks that have no coded data because, for example, they are identical to the corresponding macroblock in the preceding frame.

The coded data output unit 103 receives the picture headers, segment headers, and coded macroblocks generated by the coding unit 102, and assembles them into an output bitstream of coded data.

The size input unit 104 receives size data designating the allowable sizes of the coded segments. The size data include, for example, a first threshold indicating the allowable number of bits or macroblocks in the first segment SG0, and a second threshold indicating the allowable number of bits or macroblocks in the other segments. Alternatively, the size data include only one of the two thresholds, or include a quantity to be divided into or subtracted from the second threshold to obtain the first threshold.

The segment size control unit 105 calculates the actual values of the first threshold and second threshold from the information received by the size input unit 104. For example, the size input unit 104 may calculate the first threshold by dividing the second threshold by two, or subtracting a given quantity from the second threshold. Either of the two thresholds may have a predetermined value that does not depend on the other threshold. For example, the first segment may be limited to one macroblock, or to the picture header alone (no macroblocks). However the two thresholds are determined, the first threshold value is always smaller than the second threshold value. The segment size control unit 105 supplies the two threshold values to the segmentation unit 106.

The segmentation unit 106 uses the two threshold values, and the amounts of coded data reported by the coding unit 102, to determine the points at which each frame is to be divided into segments, and informs the coding unit 102 of these points so that the coding unit 102 can generate the proper header information. Each segment ends, for example, with the last macroblock that could be coded within the relevant threshold value, or the first macroblock that exceeded the threshold value.

Next, the operation of the first embodiment will be briefly described.

The picture data are coded by the coding unit 102 and divided into segments by the segmentation unit 106 as explained above. When the segmentation unit 106 notifies the coding unit 102 of a segment division, the coding unit 102 may, if necessary, repeat part of the coding of the current macroblock in order to place it in the next segment. Since the segment division points are determined by threshold values, these division points occur at arbitrary locations in the frame, as indicated in FIG. 7. Since the first threshold is smaller than the second threshold, the first segment SG0 is normally smaller than any of the other segments.

Depending on the details of the segmentation scheme, the first segment SG0 may occasionally exceed one of the other segments in size, but at least the average size of the first segment, over a series of frames, is smaller than the average size of the other segments.

The bitstream generated by the coded data output unit 103 is transmitted to a decoding device (not shown) through a communication network (not shown) that transports each segment as a separate packet. Alternatively, the bitstream is first stored on a recording medium, each segment being stored as a separate record, and is transmitted to or read by the decoding device later.

When the bitstream is transmitted, the small size of the initial segment SG0 in each frame enhances the probability that the packet including this segment will be transmitted successfully, without being dropped. The likelihood that an entire frame will be made undecodable due to the loss of its picture header is thereby reduced to a low level.

If the bitstream is stored on a recording medium, the small size of the first segment reduces the probability of a read error or write error in this segment.

The substantially equal sizes of the other segments in the frame implies that none of these segments has an especially high probability of being dropped or damaged. That is, the worst-case error probability is minimized. This, combined with the low probability of loss of the picture header, gives each of the other segments a good chance of being decoded successfully.

Compared with conventional schemes that guard against picture-header loss by repeating all of the picture-header information in the segment headers, or by repeating all picture-header information that differs from the information in the preceding frame, the first embodiment is more efficient, because it repeats less header information.

Compared with the conventional schemes shown in FIGS. 4, 5, and 6, the first embodiment reduces the probability of loss of the picture header, by reducing the size of the critical segment that includes the picture header.

Compared with schemes that reduce the size of critical and non-critical segments alike to reduce the probability of packet loss, thereby increasing the number of segments per frame and the total amount of header information per frame, the first embodiment is more efficient because it reduces the size of only the critical first segment. The number of segments per frame and the total amount of header information per frame remain substantially unchanged.

By reducing the probability of loss of an entire frame without using an increased amount of header information, the first embodiment leaves the normal number of bits available for the coded macroblock data. Accordingly, there is no reduction in coding efficiency, and no degradation of normal picture quality.

Since the first embodiment only requires alteration of the segment size, and does not require alteration of the header information, it does not require extensive modification of existing coders and decoders.

The size input unit 104 enables the segment sizes to be changed by, for example, a service technician or an operator of the coder 100.

In a variation of the first embodiment, however, the size input unit 104 is omitted, and the values of the first and second thresholds are fixed.

In another variation, the segmentation unit 106 determines the size of the first segment on the basis of two thresholds, one specifying a maximum number of bits, the other specifying a maximum number of coded macroblocks. The first segment is terminated when either one of these two thresholds is reached. The size of the other segments may also be determined on the basis of two thresholds.

Next, a second embodiment will be described. The second embodiment controls the segment size by controlling the quantization step size, instead of by using thresholds. The second embodiment is suitable when each segment starts at a fixed location in the frame, as illustrated in FIG. 4.

Figure 9:
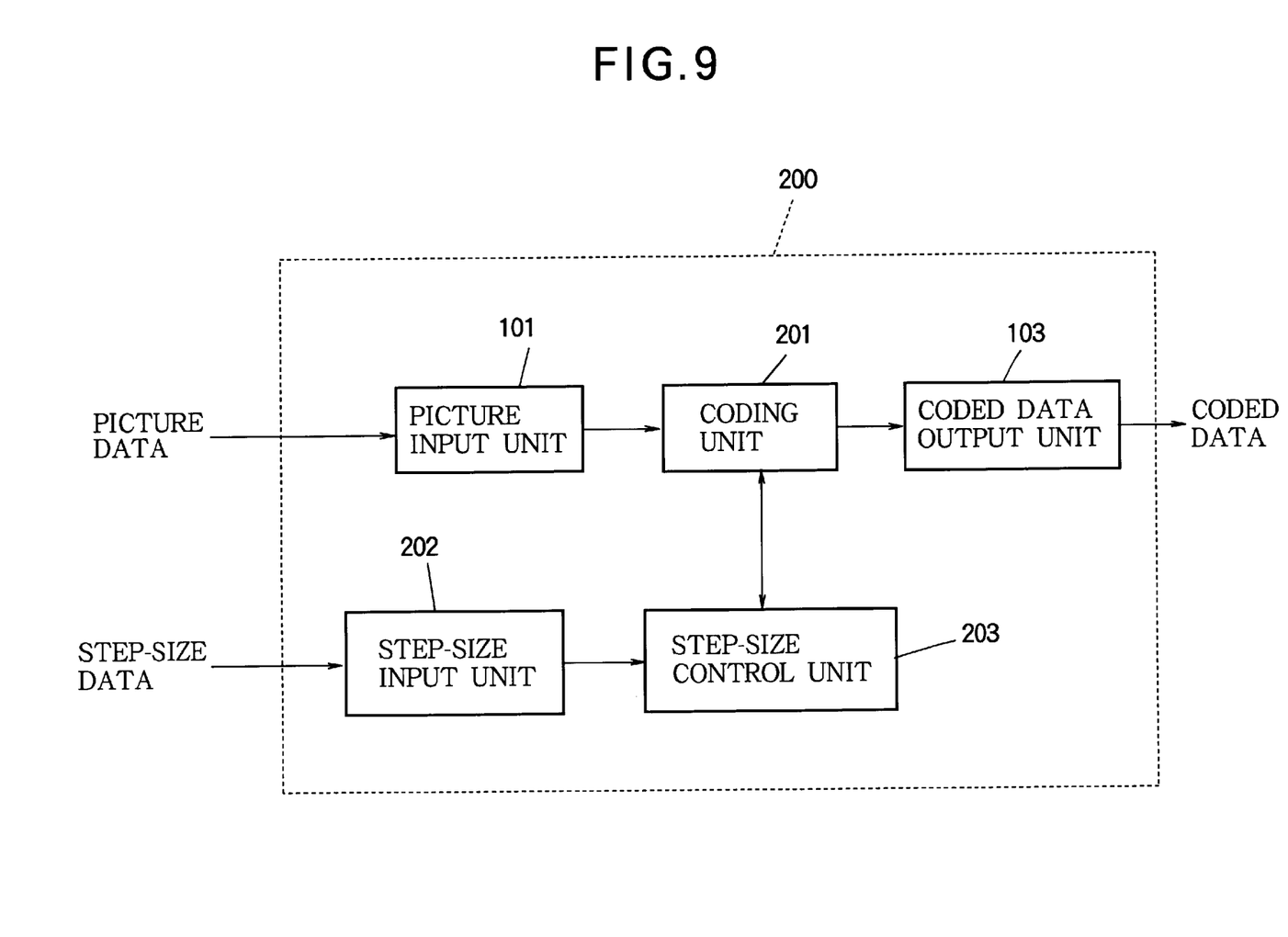
FIG. 9 is a block diagram of a picture coder illustrating a second embodiment.

Referring to FIG. 9, the picture coder 200 in the second embodiment comprises the picture input unit 101 and coded data output unit 103 described in the first embodiment, a modified coding unit 201, a step-size input unit 202, and a step-size control unit 203.

The coding unit 201 divides the picture data into macroblocks, groups the macroblocks into predetermined segments, and codes each macroblock by a method that includes quantization. For the first segment in each frame, the coding unit 201 uses a quantization step size supplied by the step-size control unit 203. For other segments, the coding unit 201 uses a conventional quantization step size. The coding unit 201 also generates picture headers and segment headers as explained in the first embodiment.

The step-size input unit 202 receives external data specifying the quantization step size of the first segment. The step-size data may specify the absolute value of the step size, or may be a parameter specifying the step size in relation to the step size of the other segments. For example, the parameter may be a multiplier value (e.g., ×1.5) to be multiplied by the step size of the other segments, or an increment (e.g., +4) to be added to the step size of the other segments.

The step-size control unit 203 uses the information received by the step-size input unit 202 to determine the quantization step size of the first segment, making this step size larger than the quantization step size of the other segments. If necessary, information concerning the quantization step size of the other segments is obtained from the coding unit 201.

During the operation of the second embodiment, the coding unit 201 codes the received picture data as described above. A large quantization step size reduces the amount of coded data, so the coding unit 201 usually generates less coded data for the first segment in each frame than for the other segments in the frame, and never generates a very large amount of coded data for the first segment.

The coded data output unit 103 places a picture header at the beginning of the first segment of each frame, and a segment header at the beginning of the other segments in the frame.

As in the first embodiment, each segment is transmitted in a separate packet through a communication network, or is recorded separately on a recording medium. The comparatively small size of the first segment reduces the risk of packet loss, or of read/write errors, thereby enhancing the probability that the picture header will be decoded successfully.

Like the first embodiment, the second embodiment does not require extensive modifications to existing coders and decoders, and does not require additional header information. Since the segmentation of each frame is predetermined, increasing the quantization step size of the first segment does not increase the number of segments by even one segment; the total amount of header information is unchanged.

Differing from the first embodiment, there is some loss of picture quality in the first segment, because of the increased quantization step size. There is a corresponding gain in coding efficiency, however, because fewer bits are needed to code the first segment.

In a variation of the second embodiment, the step-size input unit 202 is eliminated, and the step-size control unit 203 assigns a predetermined quantization step size to the first segment. The predetermined size may be a comparatively large fixed size (e.g., thirty-one), or a size determined in a fixed way in relation to the quantization step size of the other segments (e.g., always 1.5 times the quantization step size of the other segments).

In another variation of the second embodiment, the coding unit 201 determines the quantization step size of each segment according to a target bit rate. The step-size control unit 203 sets a comparatively low target bit rate for the first segment, causing the coding unit 201 to select a comparatively large quantization step size for this segment. In this case, the bits saved in the first segment can be added to other segments, so that the loss of picture quality in the first segment is balanced by a gain in picture quality in the other segments.

Next, a third embodiment will be described. The third embodiment controls the segment size by controlling the coding mode.

Figure 10:
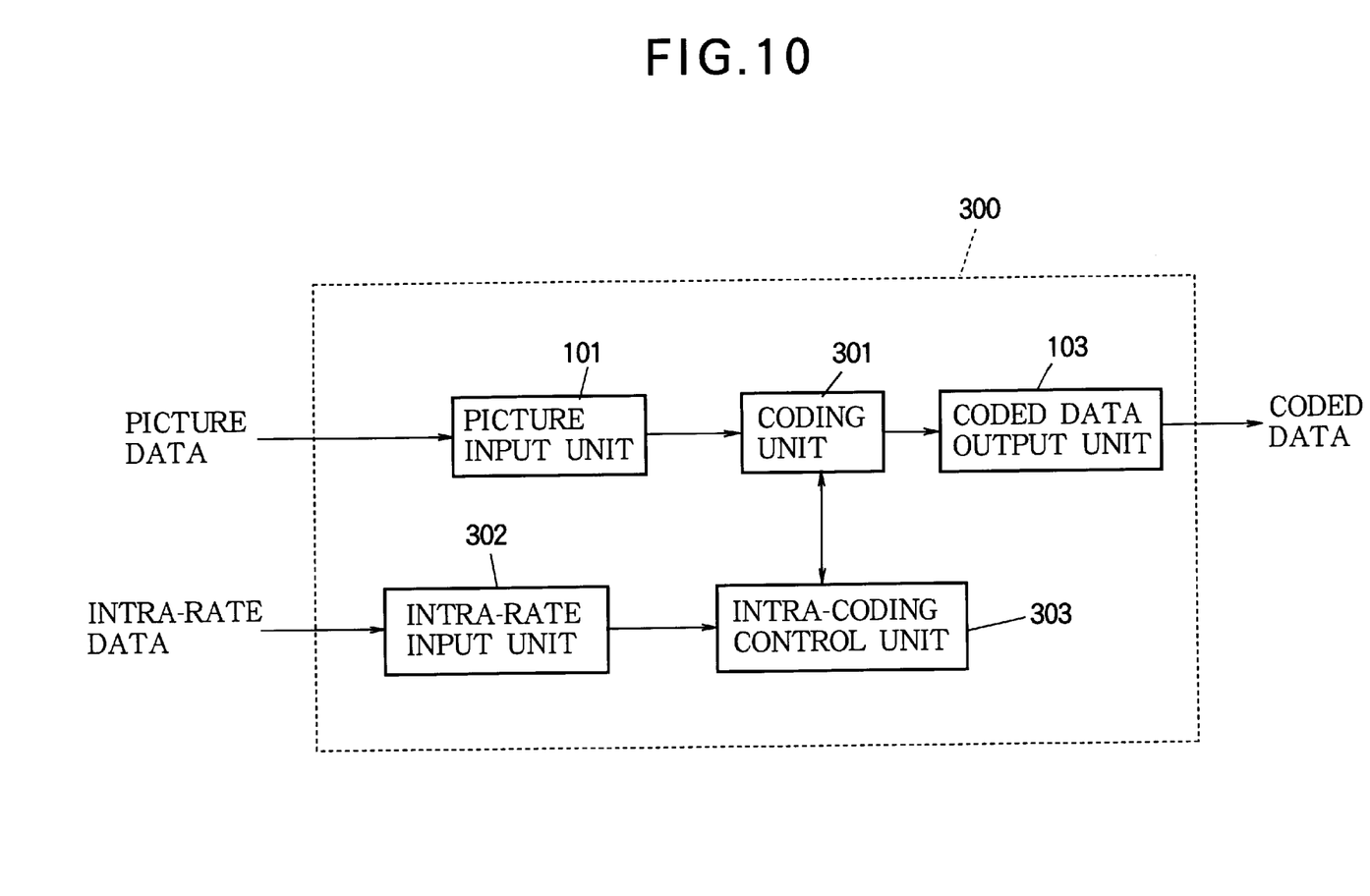
FIG. 10 is a block diagram of a picture coder illustrating a third embodiment.

Referring to FIG. 10, the picture coder 300 in the third embodiment comprises the picture input unit 101 and coded data output unit 103 described in the first embodiment, a modified coding unit 301, an intra-rate input unit 302, and an intra-coding control unit 303.

The coding unit 301 divides the picture data into macroblocks, groups the macroblocks into segments, selects intra-frame coding or inter-frame coding for each macroblock, and codes each macroblock by the selected method. Inter-frame coding is usually more efficient than intra-frame coding, and is selected more often, but inter-frame coding also allows decoding errors to propagate from frame to frame. To halt such propagation, the coding unit 301 codes each macroblock by intra-frame coding at least once every N frames, where N is a certain integer. The reciprocal of N (1/N) is referred to as the forced intra-coding rate, or the intra-refresh rate. A macroblock coded by intra-frame coding solely to comply with this intra-coding rate requirement is referred to as a forced intra-macroblock.

In the first segment of each frame, the coding unit 301 employs a forced intra-coding rate determined by the intra-coding control unit 303. In the other segments, the coding unit 301 employs a conventional forced intra-coding rate.

The coding unit 301 also generates picture headers and segments headers as explained in the first embodiment.

The intra-rate input unit 302 receives external data specifying the forced intra-coding rate of the first segment. The external data may specify the value of N, for example, or may specify a minimum number M of macroblocks for which intra-frame coding must be selected in the first segment of every frame. Alternatively, M may be the maximum number of forced intra-macroblocks in the first segment. The external data may specify M or N explicitly, or in relation to the corresponding value used for the other segments. For example, the external data may specify that the value of M in the first segment is half the value of M in the other segments, or is two less than the value of M in the other segments.

The intra-coding control unit 303 uses the information received by the intra-rate input unit 302 to limit the use of forced intra-frame coding in the first segment, making the forced intra-coding rate smaller in the first segment than in other segments. If necessary, information about the forced intra-coding rate of the other segments is obtained from the coding unit 301.

During the operation of the second embodiment, the coding unit 301 selects intra-frame coding less often in the first segment than in the other segments in each frame. Since intra-frame coding is less efficient than inter-frame coding, reducing the frequency of intra-frame coding in the first segment reduces the average size of the coded data in the first segment, as compared with the other segments.

As in the preceding embodiments, the comparatively small size of the first segment reduces the risk that this segment will be lost in transmission, or will be affected by a read/write error, thereby increasing the probability that the picture header will be decoded successfully.

Like the preceding embodiments, the third embodiment does not require extensive modifications to existing coders and decoders, and does not require additional header information.

If a decoding error occurs in a macroblock in the first segment of a frame, the error may propagate into a relatively large number of succeeding frames, because of the reduced intra-coding rate in the first segment. There is, accordingly, an increased risk of extended picture damage, but the risk is confined to the first segment, and is balanced by the reduced risk of picture-header loss. In other words, the third embodiment tolerates more errors than usual in the first segment, in order to reduce the risk of loss of an entire frame.

The third embodiment also provides a gain in coding efficiency, due to the increased use of inter-frame coding in the first segment.

In a variation of the third embodiment, the intra-rate input unit 302 is eliminated, and the intra-coding control unit 303 assigns a fixed forced intra-coding rate to the first segment, or determines this rate in a fixed way from the forced intra-coding rate of the other segments, or sets a fixed upper limit, such as a limit of one macroblock, on the number of forced intra-macroblocks in the first segment.

Many variations are possible in the way in which compliance with the forced intra-coding rate is obtained. For example, the coding unit 301 may code each segment entirely by intra-frame coding once every N frames, using a larger value of N for the first segment than for the other segments.

The third embodiment can be combined with the first or second embodiment.

Next, a fourth embodiment will be described. The fourth embodiment controls segment size according to conditions on a communication path or network, such as an Ethernet local area network (LAN), through which the coded data will be transmitted.

Figure 11:
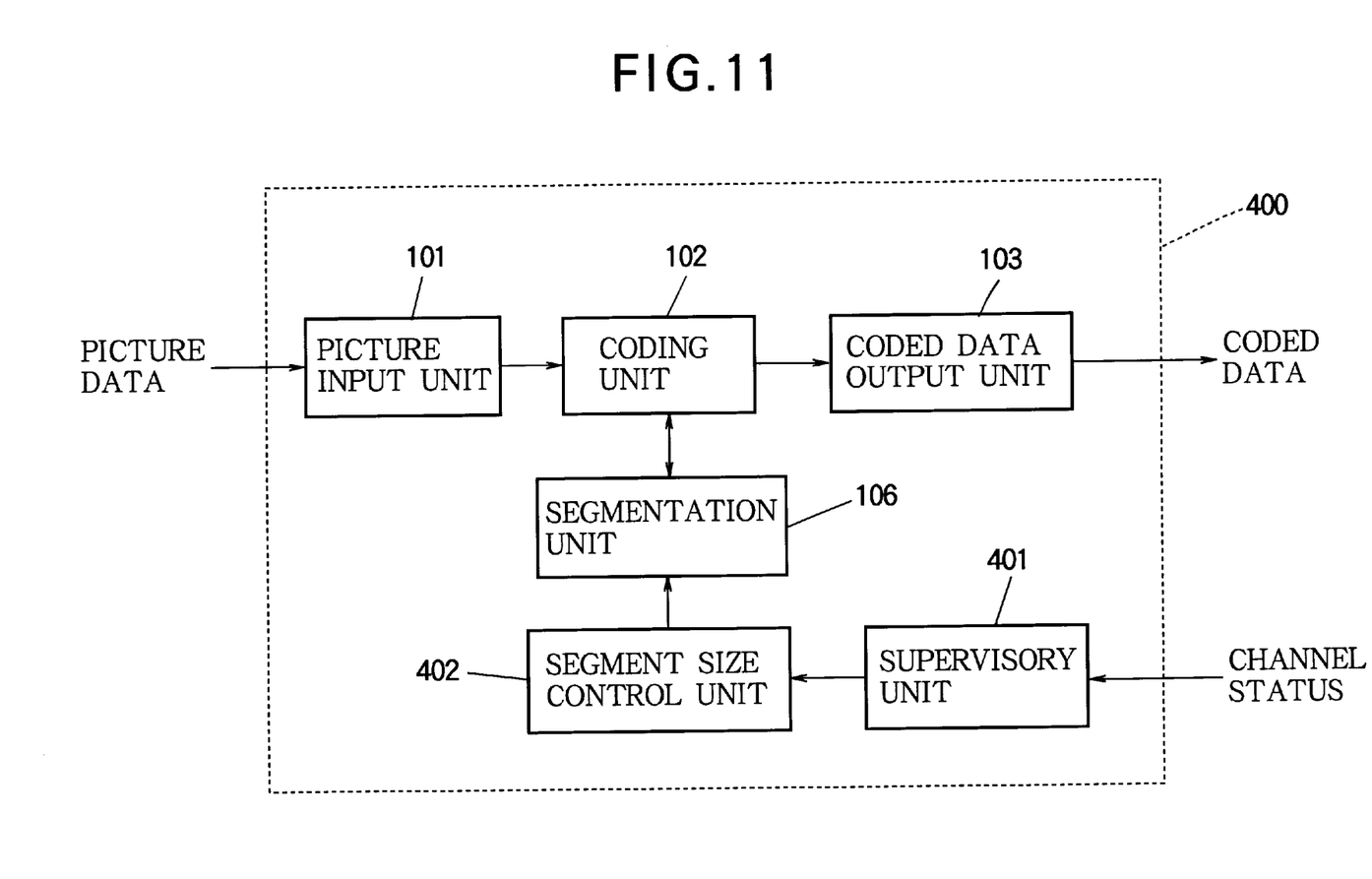
FIG. 11 is a block diagram of a picture coder illustrating a fourth embodiment.

Referring to FIG. 11, the picture coder 400 in the third embodiment comprises the picture input unit 101, coding unit 102, coded data output unit 103, and segmentation unit 106 described in the first embodiment, a supervisory unit 401, and a segment size control unit 402.

The supervisory unit 401 obtains what will be referred to as channel status information from the communication path or network through which the output bitstream is transmitted. The channel status information is the rate of transmission errors on the communication path on which the coded segments are transmitted, or information related to the rate of transmission errors, from which the supervisory unit 401 monitors the status of the communication path. For example, the supervisory unit 401 may receive acknowledgment signals from a decoder to which the coded segments are sent, and infer the status of the communication path from the percentage of segments that are positively acknowledged, or negatively acknowledged. Alternatively, the supervisory unit 401 may use the round-trip transmission time, as determined from these acknowledgment signals, to infer the present degree of network congestion. If the network provides an explicit congestion indication, this may also be used. In a packet network, a high degree of congestion implies a comparatively high probability that packets will be dropped. The supervisory unit 401 keeps the segment size control unit 402 informed of the current status of the communication path.

On the basis of the reported path status, the segment size control unit 402 selects the segment size. Under favorable conditions, when the transmission error rate is expected to be low, the segment size control unit 402 selects a comparatively large segment size. Under unfavorable conditions, when the transmission error rate is expected to be high, the segment size control unit 402 selects a comparatively small segment size.

The segmentation unit 106 and coding unit 102 cooperate to divide the coded data into segments of substantially the size selected by the segment size control unit 402, the segmentation unit 106 using the selected size as a threshold value as described in the first embodiment. The selected size is applied to all segments.

During the operation of the fourth embodiment, the segment size control unit 402 controls the segment size dynamically, increasing the segment size when conditions on the communication path improve, and decreasing the segment size when conditions worsen. Segment size may be measured in terms of either the number of coded bits per segment, or the number of coded macroblocks per segment, as explained in the first embodiment.

When conditions are favorable and the probability of transmission errors is low, the comparatively large segment size reduces the amount of header information per frame, because there are fewer segments and thus fewer segment headers per frame.

When conditions are unfavorable and the probability of transmission errors is relatively high, the small segment size limits the effect of most errors to a small part of the picture. If packet communication is used, the small segment size also reduces the probability of packet loss, and thus the probability of loss of the first segment, which contains the picture header. It should be noted that, in some cases, reducing the segment size may increase the probability that a transmission error will occur somewhere in a frame, because the total amount of coded data is increased, but the reduced segment size is still advantageous if it lessens the probability that a transmission error will affect the critical information in the picture header.

By controlling the segment size dynamically, the fourth embodiment is able to operate with an appropriate segment size under all conditions, taking advantage of favorable conditions to improve the coding efficiency, and limiting the effect of the inevitable transmission errors when conditions are unfavorable.

Like the preceding embodiments, the fourth embodiment does not require extensive modification of existing coders or decoders.

In a variation of the fourth embodiment, the segment size control unit 402 determines the number of segments per frame according to the status reported by the supervisory unit 401, and the segmentation unit 106 divides the coded data into segments at a corresponding number of predetermined points in each frame, as illustrated in FIG. 4.

The fourth embodiment can be combined with any one of the preceding embodiments, thereby providing better protection for the picture header by making the first segment smaller than the other segments.

Other possible combinations include the first, third, and fourth embodiments, and the second, third, and fourth embodiments.

In summary, all of the embodiments described above reduce the risk that packets including picture headers will be dropped, by reducing the size of these packets. The first three embodiments always reduce the size of these packets. The fourth embodiment reduces the size of these (and other) packets when the risk of packet loss is heightened by adverse conditions on the communication path.

The first three embodiments provide similarly improved protection for picture headers in coded data stored on recording media.

The fourth embodiment minimizes the amount of header information that has to be transmitted to obtain adequate error protection, by adjusting the segment size or the number of segments per frame according to conditions on the communication path.

Although the first three embodiments have been described in terms of providing protection for a picture header, the same principle can be applied in any picture-coding scheme that divides a frame into critical and non-critical segments.

The invention can be practiced either in hardware or in software.

Those skilled in the art will recognize that further variations are possible within the scope claimed below.

What is claimed is:

1. A method of coding a frame of picture data in which the coded picture data are divided into segments including a critical segment and at least one non-critical segment, the critical segment including a picture header, each non-critical segment including only information other than the picture header, the method comprising the step of:
   (a) adjusting the critical segment in size so that the critical segment is smaller than each said non-critical segment.

2. The method of claim 1, wherein the frame is coded by a method including quantization, and step (a) further comprises the steps of:
   (e) selecting a first quantization step size for use in coding of each said non-critical segment; and
   (f) selecting a second quantization step size, larger than the first quantization step size, for use in coding of the critical segment.

3. The method of claim 1, wherein the frame is coded by inter-frame coding and intra-frame coding, intra-frame coding being forced to occur at a certain rate, and said step (a) further comprises the steps of:
   (g) selecting a first forced intra-frame coding rate for use in each said non-critical segment; and
   (h) selecting a second forced intra-frame coding rate, lower than the first forced intra-frame coding rate, for use in the critical segment.

4. A method of coding a frame of picture data in which the coded picture data are divided into segments including a critical segment and at least one non-critical segment, the critical segment including information needed for decoding all of the segments in the frame, each non-critical segment including only information needed for its own decoding, the method comprising the steps of:
   (a) determining a first threshold and a second threshold, the first threshold being smaller than the second threshold;
   (b) terminating the critical segment when the size of the critical segment reaches the first threshold; and
   (c) terminating each said non-critical segment when the size of the non-critical segment reaches the second threshold.

5. The method of claim 4 wherein the first threshold and the second threshold specify respective numbers of bits of coded picture data.

6. The method of claim 4 wherein the frame is divided into macroblocks, and the first threshold and the second threshold specify respective numbers coded macroblocks.

7. A coder for coding a frame of picture data and dividing the coded picture data into segments, the segments including a critical segment and at least one non-critical segment, the critical segment including picture header, each non-critical segment including only information other than the picture header, the coder comprising:
   a control unit adjusting the critical segment in size so that the critical segment is smaller than each said non-critical segment.

8. The coder of claim 7, wherein the control unit adjusts the segments in size by selecting a first quantization step size for use in coding of each said non-critical segment, and selecting a second quantization step size, larger than the first quantization step size, for use in coding of the critical segment.

9. The coder of claim 7, wherein the frame is coded by inter-frame coding and intra-frame coding, intra-frame coding being forced to occur at a certain rate, and the control unit adjusts the segments in size by selecting a first forced intra-frame coding rate for use in each said non-critical segment, and selecting a second forced intra-frame coding rate, lower than the first forced intra-frame coding rate, for use in the critical segment.

10. A coder for coding a frame of picture data and dividing the coded picture data into segments, the segments including a critical segment and at least one non-critical segment, the critical segment including information needed for decoding all of the segments in the frame, each non-critical segment including only information needed for its own decoding, the coder comprising:
   a control unit determining a first threshold and a second threshold, the first threshold being smaller than the second threshold; and
   a segmentation unit terminating the critical segment when the size of the critical segment reaches the first threshold, and terminating each said non-critical segment when the size of the non-critical segment reaches the second threshold.

11. The coder of claim 10 wherein the first threshold and the second threshold specify respective numbers of bits of coded picture data.

12. The coder of claim 10 wherein the frame is divided into macroblocks, and the first threshold and the second threshold specify respective numbers coded macroblocks.

* * * * *